UNITED STATES PATENT OFFICE 2,578,858

FUMIGATING COMPOSITIONS

James Taylor, Saltcoats, John Macfie Holm, West Kilbride, and Alexander Cantlay Hutchison, Saltcoats, Scotland, assignors to Imperial Chemical Industries Limited, a corporation of Great Britain No Drawing. Application December 12, 1949, Serial No. 132,632. In Great Britain September 18, 1946

13 Claims. (Cl. 167—40)

The present invention is a continuation-in-part of applicants' copending application Serial No. 774,692, now abandoned, and relates to the art of fumigating with pesticidal or insect repellant compounds, and more particularly, to the provision of improved compositions for the thermal production of fumes of pesticidal or insect repellant compounds that are capable of vaporization when suitably heated.

The invention is especially valuable for the purpose of fumigating with combustible pesticidal or insect repellant compounds which are easily decomposed when overheated. The invention, for instance, facilitates the economical production of a fume comprising an aerosol of the condensed vapor of such a compound which can deposit on the bounding surfaces of a closed space in which the fume is generated so as to produce a thin layer of the compound that will be active after the atmosphere is clear of the actual fumes.

One example of a pesticide capable of depositing such a layer when a suitable composition is employed to volatilize it is the very powerful insecticide gamma hexachlorocyclohexane. A further example is the powerful insecticide "D. D. T." now described as alpha-alpha-bis (parachlorophenyl) beta-beta-beta trichlorethane. Both insecticides may be applied in the form of a smoke by volatilization from hot plates or by other heating methods. These methods, however, may tend to decompose the pesticidal or insect repellant compound due to overheating. It is, therefore, desirable to provide a composition which will vaporize the insecticide without decomposing the same by overheating.

In United States Patent No. 2,440,082, there is claimed a fumigating composition comprising a thermally vaporizable pesticidal compound, ammonium nitrate and an ammonium nitrate sensitizing salt of chromic acid in amount sufficient to render the composition capable of propagating throughout itself at ordinary atmospheric pressure an exothermic reaction when initiated by local heating means. Under these conditions, the decomposition of the ammonium nitrate into gaseous products takes place at comparatively low temperatures whereby an aerosol of the pesticidal compound is advantageously produced.

The compositions of United States Patent No. 2,440,082, have been widely produced and have been found very satisfactory except for several inherent disadvantages. These compositions, upon ignition, undergo self-sustained thermal decomposition in a period of about 1 to 1½ minutes. In open-air fumigation it is desirable to be able to evolve the pesticidal fumes at a slower rate than the compositions of the cited patent permit. By a slower rate of evolution, a smoke generator may be moved from one spot to another in a specified area in order to spread the smoke over a wider area. The generation of fumes at a slower rate will also permit the production of lower lying clouds of the pesticidal fume. These lower lying clouds are, of course, more effective in their pesticidal action in view of the fact that they are not as localized as the clouds resulting from pesticidal generation where thermal decomposition proceeds at a faster rate.

A further disadvantage of the compositions set forth in United States Patent No. 2,440,082, is the effect of the chromate compositions on the health of the workers utilizing the same. It is most desirable to provide compositions which do not adversely affect the health of the workers and for this reason, further research work has been carried out in order to develop such compositions.

The object of the present invention is to provide new or improved fumigating compositions which permit the vaporization of pesticides or insect repellants without thermal decomposition thereof.

A further object of this invention is to provide new or improved fumigating compositions which will generate the vaporized pesticide at a slower rate than heretofore possible.

Another object of the present invention is to provide new or improved fumigating compositions which, when utilized, will not offer health hazards to the workers employing the same or to persons or animals in the vicinity of the fumigation operation.

Other objects of the present invention will become apparent to those skilled in the art by the description of the new and improved fumigating compositions occurring hereinafter.

It has been found that exothermic gas producing compositions comprising ammonium nitrate and a solid sensitizer for the thermal decomposition of ammonium nitrate, other than a salt of chromic acid, may have admixed with them suitable proportions of pesticides or insect repellant compounds so as to yield fumigating compositions which, when locally heated, will undergo self-sustained thermal decomposition at temperatures high enough to permit substantially the whole of the said compound to be vaporized but not so high as to cause the pesticide to undergo destruction beyond a limited degree during the said vaporization. By this means, aerosols of the condensed vapor of the fumigating compound are produced and the compound is thereby dispersed in a state of fine sub-division.

It has been found that pulverulent copper and copper-containing salts are suitable for carrying out the objects of this invention. Among the suitable salts of copper are cuprous chloride, cupric oxide, copper nitrate, copper tartrate, cupric acetate, copper ammonium chloride, copper ammonium nitrate, copper oxyacetate, and copper butyl phthalate. The preferred copper salt is cuprous chloride. Copper nitrate and cupric oxide preferably are used with a small amount of charcoal to assist in the control of the propagation of the reaction. The charcoal removes any possibility of failure occurring in the sustained propagation of the reaction.

These sensitizers may be employed alone and in many cases more than one may be present in the composition, while in some cases where toxicity is not of importance, there may also be present one or more of the salts of chromic acid set forth in United States Patent No. 2,440,082.

According to the present invention, therefore, the fumigating compositions of this invention comprise a mixture of a thermally vaporizable pesticidal or insect repellant compound, ammonium nitrate, and at least one copper-containing material for the thermal decomposition of the ammonium nitrate in order to permit self-sustained gas producing thermal decomposition of the ammonium nitrate to take place readily in the presence of the pesticidal or insect repellant compound.

The mixtures are preferably of such composition that when the ammonium nitrate is undergoing thermal decomposition, the temperature in the reaction zone is only slightly above the boiling point of the pesticidal or insect repellant compound at atmospheric pressure. In general, the higher the content of the fumigant compound the lower the temperature in the reaction zone. There is likely to be incomplete volatilization of the fumigant if the temperature is appreciably below the boiling point.

A cartridge made up from the compositions and provided with a casing designed to give protection against absorption of moisture may advantageously be employed and such cartridges may include a small piece of fuse, quick match composition, or other igniting composition in contact with the fumigating charge in order to facilitate the ignition of the latter from an ordinary friction match, fuse match, electric fuse head, or other source of ignition. The fumigating charge may desirably be in compact form produced by subjecting the pulverulent mixture of ingredients to adequate compression pressure. Alternately the mixture may be made into compact form with the aid of a binder or bonding agent and may be extruded or molded into the required shape. A charge may also be packaged if desired as a loose or compacted powder into a cartridge having a paper, cellophane, or other suitable wrapper or envelope to protect the charge from moisture.

When a local portion of the charge is heated by the ignition of the fuse or quick match composition, a gas evolving decomposition accompanied by the evolution of pesticidal or insect repellant fume and unaccompanied by flame will propagate itself through the charge when the proportions of the ingredients employed are properly chosen. It has been found that suitable compositions for carrying out the objects of this invention are provided when a ratio by weight percentage of the pesticidal compound to the ammonium nitrate to the solid sensitizer is 20-10 per cent to 68-48 per cent to 12-32 per cent. The fumigating charge provided by these ratio by weight percentages are both safe and convenient for application in a confined space.

The following examples illustrate compositions in accordance with this invention and the parts used are expressed as parts by weight.

Example I

An intimate mixture of 63.0 parts of ammonium nitrate, 27.0 parts of copper tartrate and 10.0 parts of gamma hexachlorocyclohexane in the form of a loose composition of 50 grams weight was ignited and it burned in 6 minutes. The temperature of propagation in the reaction zone was 450° C.

Example II

An intimate mixture of 27 parts cupric acetate, 63 parts ammonium nitrate and 10 parts gamma hexachlorocyclohexane in the form of a loose composition of 50 grams was ignited by a fuse match. This composition burned in 9 minutes at a reaction zone temperature of 600° C.

Example III

An intimate mixture of 90 parts of a mixture of 20 parts copper nitrate, 75 parts ammonium nitrate, and 5 parts charcoal was mixed with 10 parts of insecticide gamma hexachlorocyclohexane. 50 grams of the composition in the form of a loose powder was ignited by a fuse. The composition burned in 5 minutes 25 seconds at a reaction zone temperature of a little over 700° C.

Example IV

An intimate mixture of 80 parts of a mixture consisting of 10 parts copper oxide, 85 parts ammonium nitrate, and 5 parts charcoal was mixed with 20 parts of the insecticide gamma hexachlorocyclohexane. Upon ignition of 50 grams of this loose powder composition, a temperature of a little over 700° C. resulted in the reaction zone and 8 minutes were required for complete burning.

Example V

An intimate mixture of 56 grams of a powder consisting of 48 parts ammonium nitrate, 32 parts cuprous chloride and 20 parts alpha-alpha-bis (parachlorophenyl) beta - beta - beta trichloroethane were compacted in pellet form of 1½ inches diameter. The temperature of propagation in the reaction zone was 330° C. upon ignition and the time of burning was 4 minutes.

Example VI

An intimate mixture of 48 parts ammonium nitrate, 32 parts cuprous chloride, and 20 parts gamma benzenehexachloride were compacted in compressed pellet form. A pellet of 1½ inches diameter weighting 56 grams burned in 5½ minutes.

Example VII

For the purpose of comparing Examples I through VI with the compositions of United States Patent No. 2,440,082, 56 grams of a composition consisting of 61.5 parts ammonium nitrate, 7.5 parts potassium chromate, 6.0 parts potassium nitrate, and 25.0 parts gamma hexachlorocyclohexane was compressed in pellet form having a diameter of 1½ inches. The time required for the burning of this composition was 70 seconds. Furthermore, the fumes evolved were sufficiently toxic to endanger the health of people within the vicinity of the fumigation operation.

The hexachlorocyclohexane employed in the above examples consists of a mixture of the four isomers, alpha, beta, gamma and delta; the gamma isomer, the active insecticide, being present to the extent of about 13%. It is, of course, to be understood that other hexachlorocyclohexanes may be employed which contain an enhanced proportion of the gamma isomer. The alpha-alpha-bis (parachlorophenyl) beta-beta-beta trichloroethane employed in these examples is the commercial product containing normally about 80% of the active insecticide.

Each of the examples was carried out for the purpose of entomological tests near the center of the floor of a smoke chamber measuring approximately 10 feet by 10 feet by 10 feet. The toxicity of the deposit was established by using the flour weevil, *Tribolium castaneum* Hbst, as the test insect. The toxicity of these compositions compared quite favorably with the toxicity of the compositions of United States Patent No. 2,440,082, and was not attended by the sometimes undesirable fast rate of propagation and the accompanying fast rate of evolution of toxic fumes from the chromate-containing compositions of this patent which may be detrimental to the health of both people and animals in the immediate vicinity of the fumigation operation.

We claim:

1. A fumigating composition which comprises substantially 20 parts by weight of a thermally vaporizable pesticidal compound, 48 parts by weight of ammonium nitrate, and 32 parts by weight of cuprous chloride.

2. A fumigating composition which comprises a mixture of a thermally vaporizable pesticidal compound, ammonium nitrate, copper nitrate in a quantity sufficient to permit self-sustained gas producing thermal decomposition of the ammonium nitrate, and a minor proportion of charcoal.

3. A fumigating composition which comprises a mixture of a thermally vaporizable pesticidal compound, ammonium nitrate, cupric oxide in a quantity sufficient to permit self-sustained gas producing thermal decomposition of the ammonium nitrate, and a minor proportion of charcoal.

4. A fumigating composition which comprises a mixture of a thermally vaporizable pesticidal compound, ammonium nitrate, and at least one copper compound as a sensitizing material for solid ammonium nitrate in a quantity sufficient to permit self-sustained gas producing thermal decomposition of the ammonium nitrate.

5. A fumigating composition as set forth in claim 4 wherein said copper compound is cuprous chloride.

6. A fumigating composition as set forth in claim 4 wherein said copper compound is copper nitrate.

7. A fumigating composition as set forth in claim 4 wherein said copper compound is cupric acetate.

8. A fumigating composition as set forth in claim 4 wherein said copper compound is copper tartrate.

9. A fumigating composition as set forth in claim 4 wherein said copper compound is cupric oxide.

10. A fumigating composition which comprises a mixture of a thermally vaporizable pesticidal compound, ammonium nitrate, and at least one copper compound as a sensitizing material for solid ammonium nitrate in a quantity sufficient to permit self-sustained gas producing thermal decomposition of the ammonium nitrate, said copper compound being selected from the group consisting of copper nitrate, copper tartrate, cupric acetate, copper ammonium chloride, copper ammonium nitrate, copper oxyacetate, copper butyl phthalate and cuprous chloride.

11. A fumigating composition as set forth in claim 4 wherein the ratio by weight percentage of the pesticidal compound to the ammonium nitrate to the copper compound sensitizer is 20–10 per cent to 68–48 per cent to 12–32 per cent.

12. A fumigating composition as set forth in claim 4 wherein the thermally vaporizable pesticidal compound is alpha-alpha-bis (parachlorophenyl) beta-beta-beta trichloroethane.

13. A fumigating composition as set forth in claim 4 wherein the thermally vaporizable pesticidal compound is hexachlorocyclohexane.

JAMES TAYLOR.
JOHN MACFIE HOLM.
ALEXANDER CANTLAY HUTCHISON.

REFERENCES CITED

The following references are of record in the file of this patent:

UNITED STATES PATENTS

| Number | Name | Date |
|---|---|---|
| 2,440,082 | Flanders et al. | Apr. 20, 1948 |

OTHER REFERENCES

Hodgkinson: J. Soc. Chem. Ind., vol. 32, pp. 519–530. (Copy in Pat. Off. Library.)